(12) United States Patent
Yenn

(10) Patent No.: US 7,324,854 B1
(45) Date of Patent: Jan. 29, 2008

(54) COMPUTER-AIDED WAREHOUSE

(75) Inventor: Tzu-Chung Yenn, Taoyuan County (TW)

(73) Assignee: Atomic Energy Council - Institute of Nuclear Energy Research, Taoyuan County (TW)

( * ) Notice: Subject to any disclaimer, the term of this patent is extended or adjusted under 35 U.S.C. 154(b) by 0 days.

(21) Appl. No.: 11/527,635

(22) Filed: Sep. 27, 2006

(51) Int. Cl.
*G05B 11/01* (2006.01)
*G05B 15/00* (2006.01)
*G05B 23/02* (2006.01)

(52) U.S. Cl. ............................ 700/17; 700/83; 340/3.1
(58) Field of Classification Search ................... 700/17, 700/83
See application file for complete search history.

(56) References Cited

U.S. PATENT DOCUMENTS

| | | | |
|---|---|---|---|
| 6,252,569 B1 * | 6/2001 | Hodson et al. ............ 345/75.2 |
| 6,560,508 B1 * | 5/2003 | Radican ....................... 700/214 |
| 6,750,766 B1 * | 6/2004 | Heitner et al. .............. 340/525 |
| 6,781,563 B2 * | 8/2004 | Nishio et al. ................. 345/1.1 |
| 2002/0077728 A1 * | 6/2002 | Fukuda et al. .............. 700/286 |
| 2004/0078094 A1 * | 4/2004 | Nagatsuka et al. ............ 700/9 |
| 2004/0122532 A1 * | 6/2004 | Albert et al. ................... 700/2 |

\* cited by examiner

*Primary Examiner*—Ronald D Hartman, Jr.
(74) *Attorney, Agent, or Firm*—Banger Shia

(57) ABSTRACT

A monitor system is disclosed for use in a warehouse. The monitor system includes a server, a database stage, an operation stage, a monitor stage and a display stage. The database stage is connected to the server for storing various types of data related to access control over stuff. The operation stage includes a plurality of operation units connected to the server for taking actions related to the access control over the stuff. The monitor stage includes a plurality of monitor platforms connected to the server for monitoring scenes of the operation units. The display stage is connected to the server for showing various combinations of the scenes of the operation units.

8 Claims, 2 Drawing Sheets

COMPUTER-AIDED WAREHOUSE

BACKGROUND OF INVENTION

1. Field of Invention

The present invention relates to a computer-aided warehouse that enables operators to instantly monitor its operation and immediately and correctly take actions to correct errors whenever they occur, thus reducing errors and saving labor.

2. Related Prior Art

Warehouses are used to store various types of stuff. As the stuff becomes more and more in quantity or more and more dangerous, the need for a reliable warehouse gets stronger and stronger. For example, radioactive waste generates free radiation that is hazardous to humans and the natural environment. Therefore, the management of the radioactive waste is extremely important. As different kinds of the radioactive waste are handled in different manners, the intensity of the radiation generated thereby varies, and the locations and periods of time for the storage thereof differ from one another. The task of a warehouse for the radioactive waste is complicated and important. To this end, there have been developed various processes, devices and systems such as disclosed in Taiwanese Patent Publication Nos. 80683, 154931 and 281996.

However, to the best knowledge of the present applicant, there has not been any automatic access control system for the radioactive waste. Therefore, in access control over the radioactive waste ranging from application, examination, processing, conveying and storage, much labor is wasted and many errors are made in the processing of the related information. What is worse, operators might contact radioactive waste for too long. It is hence very likely that the operators could be exposed to radiation that is too much for them to take. The safety of the operators is jeopardized.

In co-pending Taiwanese Patent Application No. 094110294 filed by the present applicant, there is disclosed an automatic access control system that automates a warehousing process ranging from application, conveying and storage, and increases the efficiency, accuracy and security in the warehousing process.

The automatic access control system is focused on a person-less operation. Conventional single-functional monitor systems are however inadequate for monitoring the operation of the automatic access control system. Therefore, there is a need for a monitor system that enables operators to instantly monitor the operation of the automatic access control system and immediately and accurately take actions to correct errors whenever they occur, thus ensuring the security of stuff and the safety of operators.

The present invention is therefore intended to obviate or at least alleviate the problems encountered in prior art.

SUMMARY OF INVENTION

It is the primary objective of the present invention to provide a computer-aided warehouse with an access control system and a monitor system that enables operators to instantly monitor the access control system and immediately and accurately take actions to correct errors whenever they occur, thus ensuring the security of stuff and the safety of operators.

According to the present invention, a monitor system includes a server, a database stage, an operation stage, a monitor stage and a display stage. The database stage is connected to the server for storing various types of data related to access control over stuff. The operation stage includes a plurality of operation units connected to the server for taking actions related to the access control over the stuff. The monitor stage includes a plurality of monitor platforms connected to the server for monitoring scenes of the operation units of the operation stage. The display stage is connected to the server for showing various combinations of the scenes of the operation units.

Other objectives, advantages and features of the present invention will become apparent from the following description referring to the attached drawings.

BRIEF DESCRIPTION OF DRAWINGS

The present invention will be described through detailed illustration of the preferred embodiment referring to the drawings.

DETAILED DESCRIPTION OF PREFERRED EMBODIMENT

Figure 1:
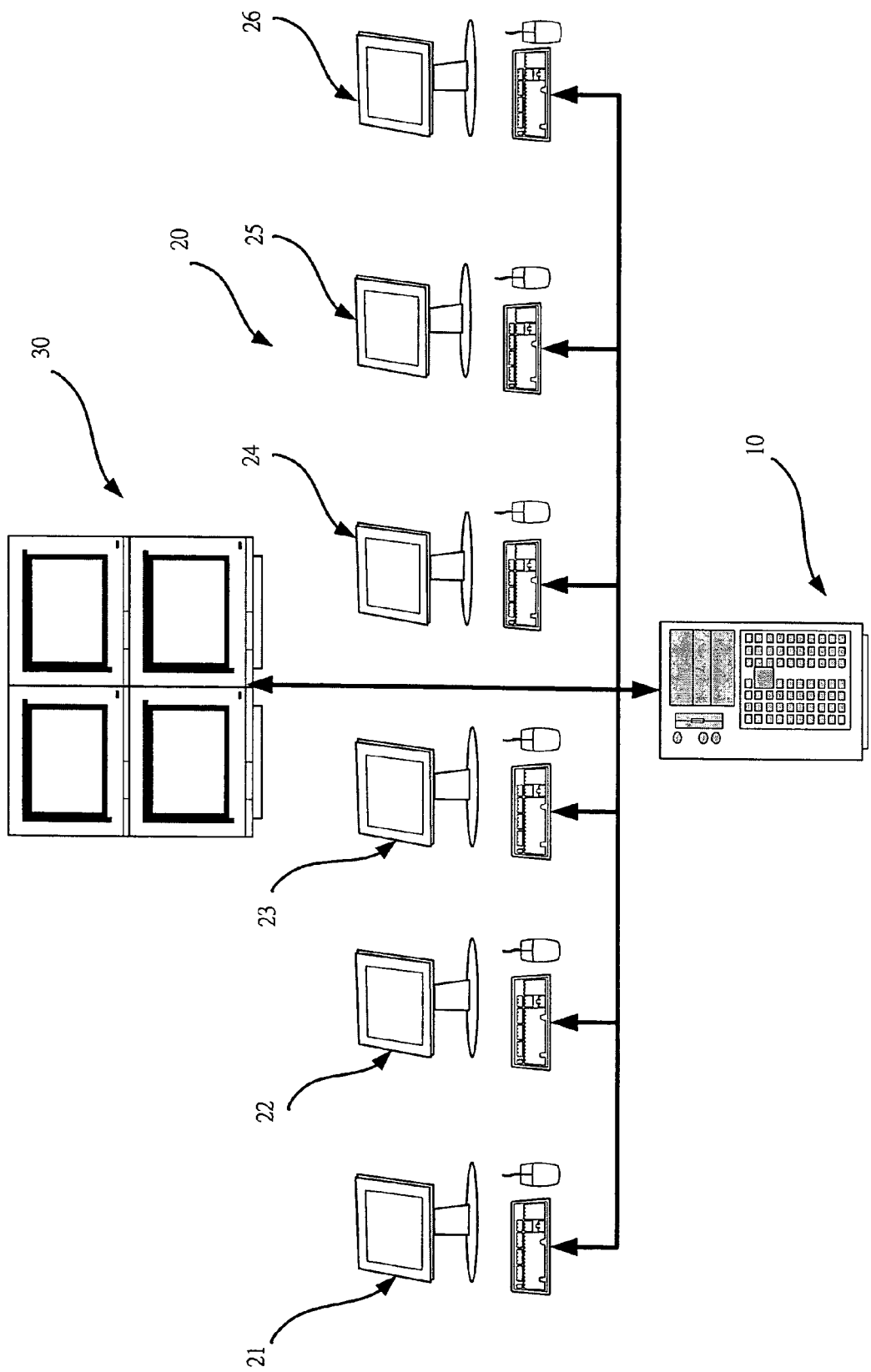
FIG. 1 is a partial view of a monitor system according to the preferred embodiment of the present invention.
Figure 2:
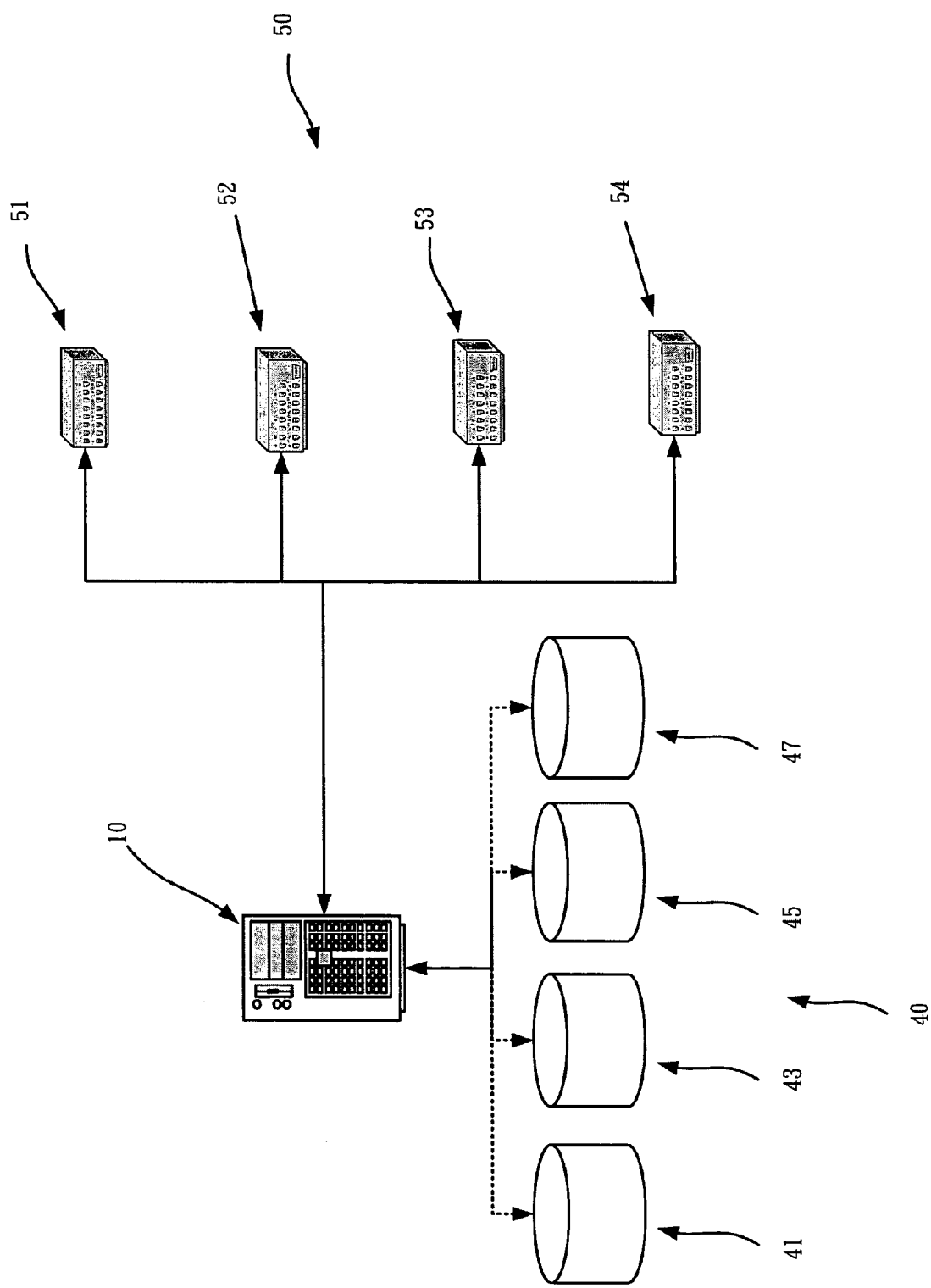
FIG. 2 is another partial view of the monitor system shown in FIG. 1.

According to the preferred embodiment of the present invention, a computer-aided warehouse includes an access control system as disclosed in Taiwanese Patent Application No. 094110294 and a monitor system shown in FIGS. 1 and 2 of the attached drawings.

The computer-aided warehousing system includes a server 10, a monitor stage 20, a gigantic display stage 30, a database stage 40 and an operation stage 50. All of the monitor stage 20, the gigantic display stage 30, the database stage 40 and the operation stage 50 are connected to server 10.

The monitor system includes a server 10, a monitor stage 20, a display stage 30, a database stage 40 and an operation stage 50. All of the monitor stage 20, the display stage 30, the database stage 40 and the operation stage 50 are connected to the server 10.

The monitor stage 20 includes hosts 21 through 26 connected to the server 10. The host 21 is a monitor platform 21 used to control the operation of environmental radiation monitor devices. The host 22 is a monitor platform used to control the operation of laser-guided vehicles (øLGVø). The host 23 is a monitor platform used to control the routes of the LGV. The host 24 is a monitor platform used to integrate the operation of the monitor platforms 21 through 23. The host 25 is a monitor platform used to process scenes of the operation stage and pictures displayed on the hosts 21 through 26. The host 26 is a monitor platform used to store data.

The display stage 30 is connected to the server 10. The display stage 30 may be a single display with a screen that can be divided into many segments or a combination of displays that are made separately and joined together so that pictures displayed on them can be viewed as parts of a larger picture. For example, the screen of such a display can be divided into 4 or 16 segments. Alternatively, 4 or 16 displays can be connected to one another. The display stage 30 is arranged along an arc so that it can clearly be viewed by operators from different angles. All of the pictures of the monitor platforms 21 through 26 can be transmitted to and shown on the display stage 30.

The database stage 40 includes memories 41, 43, 45 and 47 connected to the server 10. The memory 41 is used to store data related to applications for access to stuff such as radioactive waste. Some of the applications will be allowed while the others will be rejected. The following description will be focused on radioactive waste for simplicity. It should however be noted that the stuff housed by the computer-aided warehouse according to the present invention could be any thing to which the access is under control, not limited to the radioactive waste. The memory 43 is used to store data related to a management information system. The memory 45 is used to store data related to the allowed ones of the applications for the access to the radioactive waste. The memory 47 is used to store data related to barrels for storing the radioactive waste.

The operation stage 50 includes operation units 51 through 54 connected to the server 10. The operation unit 51 is a scrutinizing unit used to scrutinize the barrels before they are used to contain the radioactive waste. The operation unit 52 is a marking unit used to mark the barrels after they are used to contain the radioactive waste. The operation unit 53 is a conveying unit used to convey the barrels. The conveying unit 53 may actually include a plurality of LGV. The operation unit 54 is a location-confirming unit used to confirm the locations of the barrels. By computer software technology, the operation units 51 through 54 are integrated with the monitor platforms 21 through 26 so that the access control and monitor can be done by operators in a control center where the monitor platforms 21 through 26 are kept.

With help from the monitor system according to the present invention, in the control center, the operators monitor various activities related to the access control including application, examination, data management, marking, conveying and storing. For better monitor, any combination of the pictures of the monitor platforms 21 through 26 can be transferred to and shown in the display stage 30 so that all of the scenes of the operation units 51 through 54 can be displayed on the display stage 30. Based on this monitor, the operators can immediately and accurately take actions to correct errors whenever they occur.

The operation of the monitor system according to the present invention will be described referring to FIGS. 1 and 2. In the control center, the operators operate the monitor platforms 21 through 26 to monitor the operation units 51 through 54 with help from the server 10 that is used for receiving, processing and transmitting data. Alternatively, an operator may operate the monitor platform 24 to take over the operation of the monitor platforms 21 through 23. If needed, the operator can transfer any combination of the pictures of the monitor platforms 21 through 26 to the display stage 30 so that all of the scenes of the operation units 51 through 54 can be displayed on the display stage 30. Based on this monitor, the operators can immediately and accurately take actions to correct errors whenever they occur. Therefore, the security of the radioactive waste and the safety of the operators are ensured.

The present invention has been described through the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A monitor system for use in a warehouse, the monitor system comprising:
    a server;
    a database stage connected to the server for storing various types of data related to access control over stuff to be conveyed into or from the warehouse;
    an operation stage comprising a plurality of operation units connected to the server for taking actions related to the access control over the stuff;
    a monitor stage comprising:
        a first monitor platform for controlling the operation of environmental radiation monitor devices;
        a second monitor platform for controlling the operation of laser-guided vehicles;
        a third monitor platform for controlling the routes of the laser-guided vehicles;
        a fourth monitor platform for integrating the operation of the first, second and third monitor platforms;
        a fifth monitor platform for processing scenes of the operation units; and
        a sixth monitor platform for storing data; and
    a display stage connected to the server for showing various combinations of the scenes of the operation units so that an operator can instruct the operation units to take various combinations of the actions related to the access control over the stuff according to the combinations of the scenes of the operation units and the pictures shown on the monitor platforms.

2. The monitor system according to claim 1 wherein the database stage is built in the server.

3. The monitor system according to claim 1 wherein the database stage is used to store data related to applications for access to the stuff, a management information system and containers for the stuff.

4. The monitor system according to claim 1 wherein the display stage comprises a single display with a screen that can be divided into a plurality of segments.

5. The monitor system according to claim 1 wherein the display stage comprises a combination of displays that are separately made and then connected to one another so that the pictures displayed on them can be viewed as parts of a larger picture.

6. The monitor system according to claim 1 wherein the display stage is arranged along an arc so that it can clearly be viewed by operators from different angles.

7. The monitor system according to claim 1 wherein the operation stage comprises:
    a scrutinizing unit for scrutinizing containers before they are used to contain the stuff;
    a marking unit for marking the containers after they are used to contain the radioactive waste;
    a conveying unit for conveying the containers; and
    a location-confirming unit for confirming the locations of the barrels containers.

8. The monitor system according to claim 7 wherein the scrutinizing, marking, conveying and location-confirming units are integrated with the first, second, third, fourth, fifth and sixth monitor platforms.

* * * * *